United States Patent [19]

Stark et al.

[11] 3,800,714

[45] Apr. 2, 1974

[54] TROUGH HATCH LOCKING DEVICE

[75] Inventors: Marvin Stark; Jerry L. Jones, both of Michigan City; Richard L. Tuck, Sr., Highland; Herman A. Aquino, Hobart, all of Ind.

[73] Assignee: Pullman Incorporated, Chicago, Ill.

[22] Filed: Aug. 31, 1972

[21] Appl. No.: 285,149

[52] U.S. Cl............ 105/377, 16/47, 52/45, 220/57, 292/175
[51] Int. Cl........................................... B61d 39/00
[58] Field of Search......... 105/377; 220/57; 52/45; 292/175; 16/47

[56] References Cited
UNITED STATES PATENTS

| 3,605,639 | 9/1971 | Ingram | 105/377 |
| 3,176,630 | 4/1965 | Schmeider | 105/377 |
| 3,145,665 | 8/1964 | Hamilton | 105/377 |
| 3,677,196 | 7/1972 | Schuller | 105/377 |
| 2,816,683 | 12/1957 | Miers et al. | 105/377 |

Primary Examiner—Robert G. Sheridan
Assistant Examiner—Richard A. Bertsch
Attorney, Agent, or Firm—Hilmond O. Vogel

[57] ABSTRACT

A hatch cover locking device having a hinged strap pivotally attached to overlap the adjacent end portions of adjoining trough hatch covers and having a free end which is engaged by a locking bar which has a locking notch portion into which locking finger of a rotating lock bolt moves to restrain the locking bar in the latched position.

8 Claims, 4 Drawing Figures

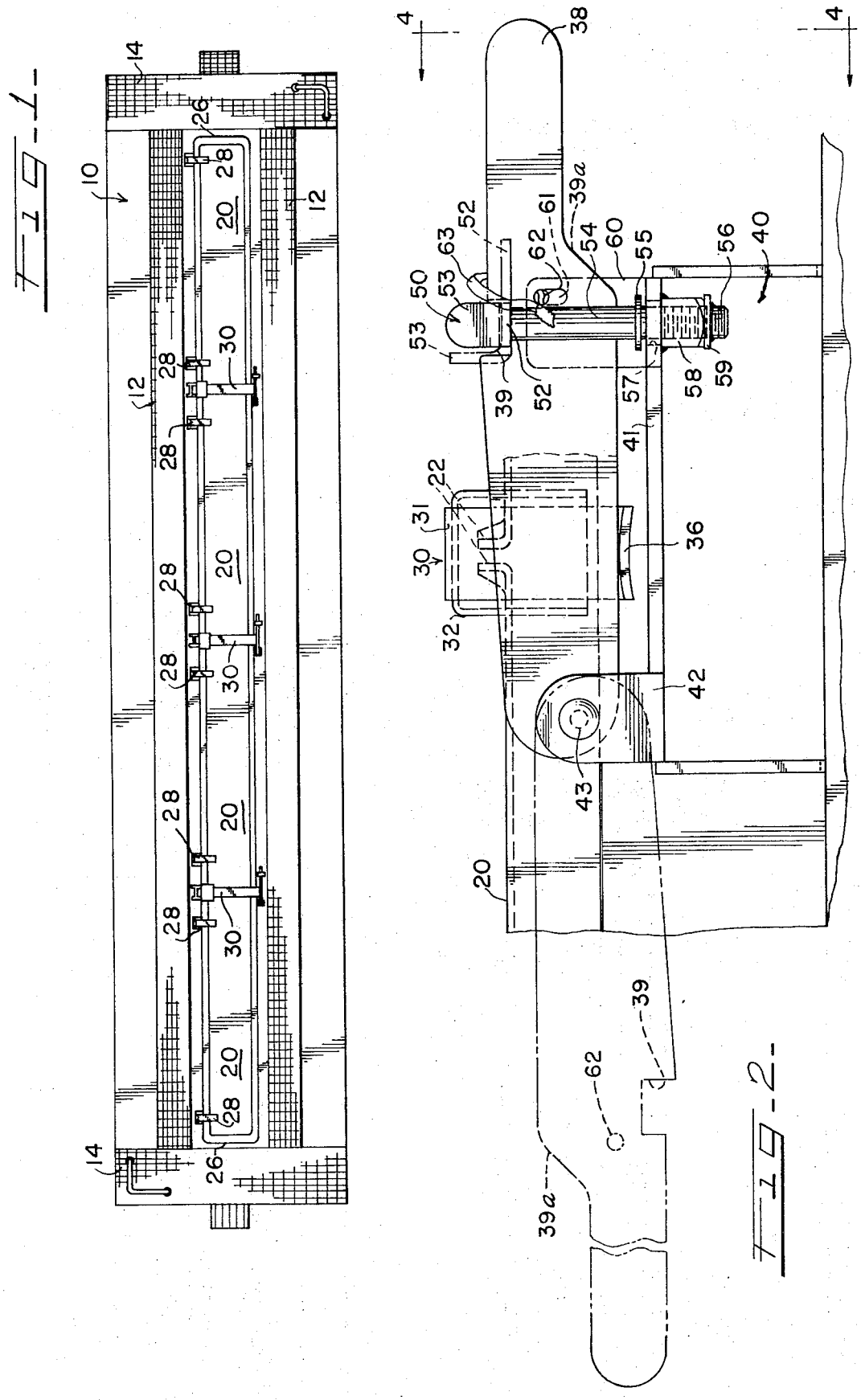

TROUGH HATCH LOCKING DEVICE

BACKGROUND OF THE INVENTION

1. Field of the Invention: This invention relates to railway hopper cars and in particular those cars having a longitudinally extending hatch opening which is closed off by a trough hatch arrangement. In this particular arrangement the adjacent end portions of each individual trough hatch cover are closed off by a locking strap which is securely held in place by a locking bar arrangement which is the subject of this invention.

2. Description of the Prior Art: The prior art disclosed in the Schilf and Letanosky U.S. Pat. No. 3,552,324 discloses a locking strap secured in place by a pivoted locking handle and spring biased locking pin assembly. The Cisco U.S. Pat. No. 2,873,696 also discloses a locking hinge strap held in place by a pivoted L-shaped locking bar which is locked in position by a locking pin.

The present invention is an improvement over the foregoing patents and includes a locking handle and other components which do not touch the roof of the hopper car and therefore will not nick or mar the painted surface which often results in early corrosion where the nicks occur.

The present invention also provides a method of locking a trough hatch cover which is not affected by buildup of ice and snow as would occur in prior art arrangements where the locking handle is received in a narrow slot and then held in place by a locking pin. Prior art locking devices such as the two patents cited do not provide a means for adjusting the locked position of a locking handle and could result in a loose locked fit should the hatch cover sealing gasket become worn.

SUMMARY

The present invention relates to a device for restraining the locking handle used to secure and seal trough hatch covers in the closed position. A rotating latch member is positioned in a threaded unit and may be screwed into the desirable operating position and then fixedly maintained in that place by a suitable stop which is attached to the threaded shank of the rotating latch. The locking handle and locking latch are spaced above the hopper car roof structure and do not include any parts which could come in contact with the roof and chip the surface thereby exposing bare metal which is easily corroded and sometimes results in discoloration of the roof and side wall surfaces of the hopper.

In operation the locking latch and its associated shank are screwed into a suitably mounted receiving nut and threaded down until positioned in an operative position whereby rotation of the latch will engage a locking handle to thereby rigidly secure the trough hatch covers in a closed and completely sealed position. The locking handle also includes a beveled or inclined edge portion which will push the locking latch out of the way when the locking handle is rotated toward the locked position thereby preventing fracture or bending of the lock and latch should it be inadvertently left in a locked position.

It is therefore an object of the present invention to provide a trough hatch locking device having a rotating latch unit which may be adjusted into its operative position and is rotatably engageable with a locking bar member which is in engagement with a hinged strap which holds down the trough hatch covers.

Another object of the present invention is to provide a locking device for a trough hatch cover which is rotatably engageable with a trough hatch locking bar and which is immune to interference from the buildup of snow and ice and is not dependent on closely mated tolerances of operative parts for its operation.

It is another object of the present invention to provide a locking handle with an inclined edge which will engage the locking latch should the latch be inadvertently in the locked position as the locking handle is rotated downwardly to close the hatches.

These and other objects of the invention will become apparent from reference to the following description, attached drawings and appended claims.

BRIEF DESCRIPTION OF THE DRAWINGS

FIG. 1 is a top plan view of a railway hopper car employing the trough hatch locking arrangement of the present invention;

FIG. 2 is an elevation view of the trough hatch locking device of the present invention;

DESCRIPTION OF THE PREFERRED EMBODIMENT

Figure 4:
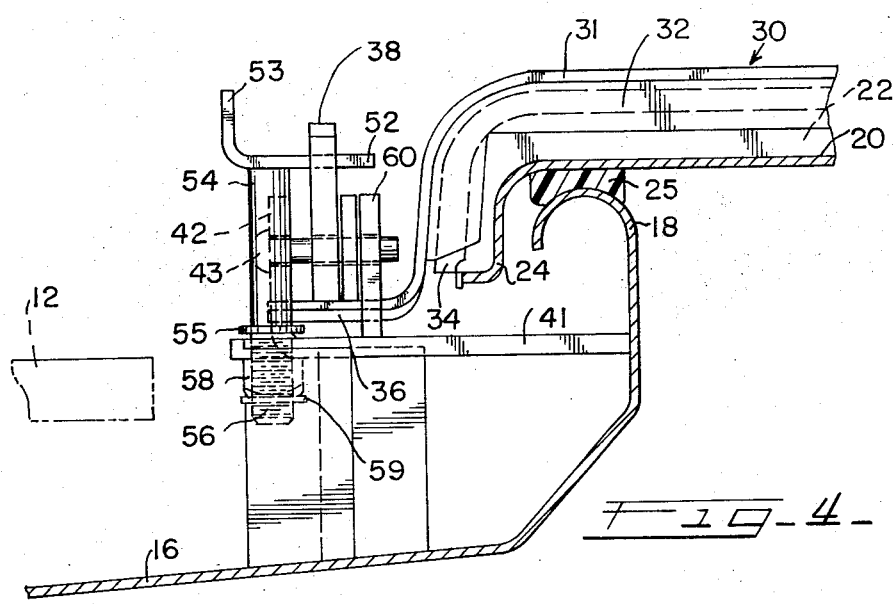
FIG. 4 is a sectional view taken generally along lines 4—4 of FIG. 2.

Referring to the drawings, a hopper car roof structure is designated by the numeral 10 and is of a general construction having slightly sloped sheet portions to provide for drainage and including a walkway assembly having a longitudinal extending walkway 12 and transversely extending walkway 14 located at the car end portions. A usual car roof sheet 16 is best illustrated in FIG. 4 and extends generally upwardly at the central portion to form the trough hatch coaming 18 which defines the reinforced top portions of the hatches. A pivoted trough hatch 20 is positioned for movement atop the coaming 18 and includes upturned intermediate end portions 22 as best shown in FIG. 2 and downwardly and outwardly turned sides which complete the hat shaped contour of the hatch cover 20. The extreme end portions of the hatch covers are designated by numeral 26 and have a downwardly and outwardly extending contour as is shown by the sides 24. The hatch covers 20 are pivotally attached to the roof structure with the hinged units 28 which are shown generally in FIG. 1.

A plurality of hinged locking straps 30 are positioned for pivotal movement adjacent the upturned intermediate end portions 22 of the trough hatch covers 20. The hinged strap unit 30 includes a transversely extending hold down bar portion 31 which is positioned on top of a holder member 32 which has an inverted U-shaped cross section and surrounds the upturned end portions 22 of the hatch covers 20. A hinged strap gasket 34 is positioned within the U-shaped holder 32 and contacts the upturned end portions 22 thereby effectively sealing off this intermediate end area of the trough hatch covers between adjacent covers. The hinged strap also includes a locking extension portion 36 which is a laterally horizontally extending portion of the hat shaped bar 31.

A roof mounted vertically rotatable locking bar is designated by the numeral 38 and has a lock receiving notched portion 39. The locking bar 38 is spaced from the roof sheets 16 by a suitable stand 40 which includes a top or mounting plate 41. A pair of pivot lugs 42 surround the pivoted end portion of the locking bar 38 and support the pivot pin 43 about which the locking bar 38 rotates.

Figure 3:
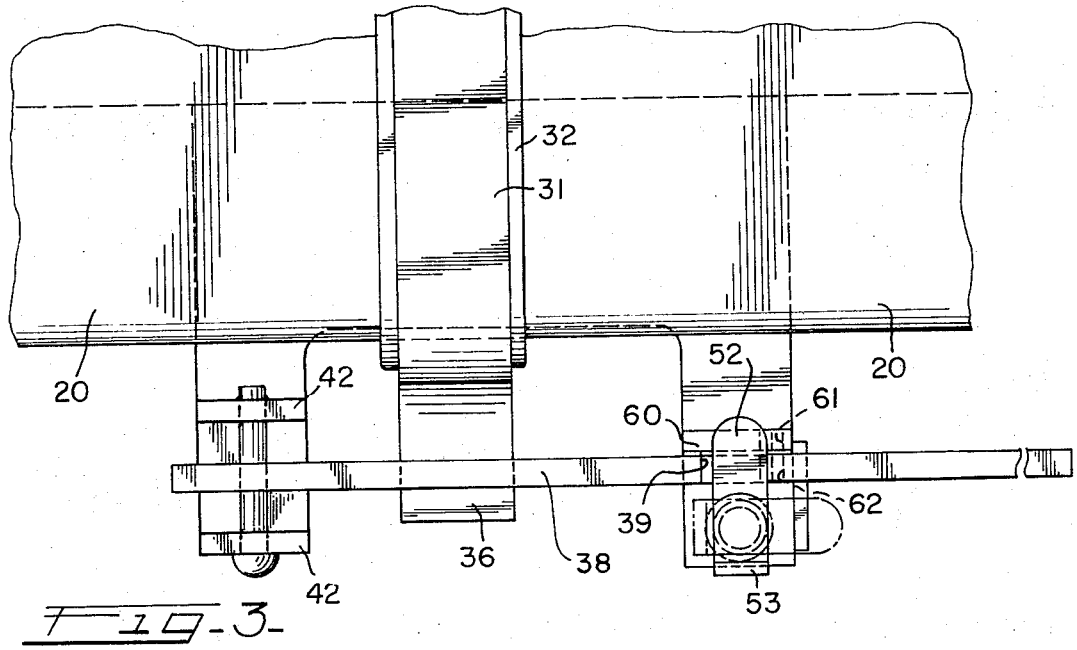
FIG. 3 is a top plan view of the locking device illustrated in FIG. 2.

The rotatable latch which is involved in the invention is designated by the numeral 50 and best illustrated in FIGS. 2, 3, and 4. The latch assembly 50 includes a locking finger 52 which is generally L-shaped and has a vertically extending tab portion 53. The locking finger 52 is positioned atop a rotatable shank 54 which has a stop flange or collar 55 fixedly attached to its lower portion, and also includes a lower threaded portion designated generally by the numeral 56. The threaded portion 56 of the shank 54 extends through an opening 57 in the mounting plate 41 and is received by a threaded nut 58 which is welded to the underside of the plate 41 and aligned with the opening 57. Once the rotatable latch is screwed into the nut 58 and in operative position to securely lock the locking bar 38 by rotation of the locking finger 52 into the notch 39, a stop washer 59 is slipped over the threaded shank portion 56 and then welded into position. Thus the rotatable latch assembly is permitted rotation, for adjustment purposes, only between the stop washers 55, 59.

A guide bar 60 is transversely spaced from the rotatable latch 50 and defines another side of the opening which receives the locking bar 38 when in the locked position. The guide bar 60 includes a generally oval seal opening 61 which is in alignment with the seal opening 62 in the locking bar 38. A flexible seal such as that illustrated in FIG. 2 may be inserted in these two openings and crimped to effect the seal.

The operation of the locking device will be explained with reference to FIG. 2 during movement of the locking handle 38 from the fully open position, illustrated in phantom, to the fully closed position which is illustrated in the solid line drawing. As noticed in FIG. 2, in the completely unlocked and open position the bar will rest above the roof sheet 16 and on the stand 40 and will not chip roof paint which could cause discoloration and corrosion of this area.

As the locking bar 38 is rotated clockwise toward the locked position the beveled edge 39a will contact the locking finger 52 should the locking finger be in a position to purportedly obstruct rotational movement of the locking bar 38. A camming action occurs as the bar 38 is lowered whereby the inclined surface 39a will push the locking finger out of the way rather than bending or fracturing the locking finger 52. Just prior to movement into the position for locking by the rotatable latch 50 the bar 38 will contact the laterally and horizontally extending locking portion 36 of the hinge strap 30 and partially deflect this cantilever section to thereby provide an additional biasing force pushing the trough hatch covers downwardly to compress their associated gaskets 25, and 34.

When the locking bar 38 moves into locking position, the opening between the guide bar 60 and the shank 54 of the rotatable latch 50 is large enough to permit easy movement even should a buildup of snow, ice, or other debris occur in this area. Locking of the bar occurs when the handle 38 is depressed below the locking finger 52 at which time the rotatable latch 50 is rotated so as to position the locking finger 52 above the notch 39 of the handle 38. Releasing the handle 38 allows the biasing force provided by the gaskets 24, 25 and the cantilever spring action of the locking portion 36 to bias the handle upward and force the notch 39 to surround the locking finger 52 in secure locking relationship.

Thus it is noticed that the locking arrangement of the present invention provides a means for securely and easily securing the trough hatch covers of a railway hopper car in the fully closed and sealed position. A simple operation is performed by an operator who may engage the handle with his foot to force it downwardly as the rotatable latch 50 is manually and conveniently rotated into the locked position.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. A hopper hatch structure with a roof provided with a hatch opening surrounded by an upstanding coaming, and a pivoted hatch cover means mounted on said roof and rotatable to engage said coaming and close the hatch opening, the improvement comprising:

a hinge strap supported adjacent said hatch and having contacting portions engaging the hatch cover means, and said hinge strap having a locking portion extension protruding outwardly of said coaming when said hinge strap is in the hatch contacting position;

a locking bar positioned for rotational movement in a plane transverse to the rotation of the hinge strap and having a locked and unlocked position;

said locking bar having a portion engageable with the hinge strap extension when the locking bar is in the locked position;

latch mounting means attached to the hopper roof and being positioned below said hinge strap extension;

a rotatable latching means supported on said latch mounting means and having a latching finger positioned above said hinge strap extension and rotatable in a horizontal plane about a vertical axis into a locking position in the path of rotation of the locking bar to thereby maintain the locking bar in the locked position;

said latching means including stop means limiting movement of said latching finger about said vertical axis; and a guide bar spaced from said rotatable latching means to thereby form a locking bar receiving means.

2. The invention according to claim 1, and:

said stop means including a threaded nut means on said latch mounting means;

said rotatable latching means including a shank with a threaded portion whereby the shank threaded portion is insertable within the nut member to thereby provide means for spacing the latching finger above the mounting means and provide an adjustable locking point for the locking bar.

3. The invention according to claim 1, and:
said locking bar including a sloped cam portion positioned to engage the latching finger and move same out of the locking position when the locking bar is lowered toward the locked position.
4. The invention according to claim 2, and:
said latching finger positioned atop the shank and having a vertically extending tab portion to facilitate movement of the latching finger.
5. The invention according to claim 2, and:
stop means fixedly attached to the shank of the rotatable locking means to thereby fix the locking point of the locking bar.
6. The invention according to claim 2, and:
said lock mounting means having a top mounting plate portion abutting the locking bar when in the unlocked position to thereby space the locking bar above said roof in the unlocked position.
7. A railway hopper car having a roof structure with a continuous longitudinally positioned trough hatch covered by hinged hatch covers having adjacent intermediate end portions and having side and end portions extending downwardly, and the improvement comprising:
a locking and sealing hinge strap positioned for independent transverse rotational hinged movement in a plane overlying the adjacent intermediate end portions of the hatch covers and said hinge strap also having an extension portion;
a locking bar positioned adjacent the trough hatch and spaced above said roof by a mounting stand to thereby permit the locking bar to swing transversely to the rotation of the locking strap;
a locking latch mounted on said stand and having a finger portion rotatable in a horizontal plane for locking engagement with the locking bar; and
said locking bar including a sloped cam portion positioned to engage the latching finger and move same out of the locked position when the locking bar is lowered into the locked position.
8. The invention according to claim 7, and:
said locking bar having a notch portion for receiving the rotatable finger portion to thereby maintain locking engagement of the locking bar and the finger portion.

* * * * *